US008555337B2

(12) United States Patent
Blom et al.

(10) Patent No.: US 8,555,337 B2
(45) Date of Patent: Oct. 8, 2013

(54) METHOD AND ARRANGEMENT FOR USER FRIENDLY DEVICE AUTHENTICATION

(75) Inventors: Rolf Blom, Järfälla (SE); Per-Olof Nerbrant, Österskär (SE); Mats Näslund, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1428 days.

(21) Appl. No.: 12/066,344

(22) PCT Filed: Sep. 8, 2005

(86) PCT No.: PCT/SE2005/001308
§ 371 (c)(1),
(2), (4) Date: Aug. 9, 2008

(87) PCT Pub. No.: WO2007/030043
PCT Pub. Date: Mar. 15, 2007

(65) Prior Publication Data
US 2009/0307748 A1 Dec. 10, 2009

(51) Int. Cl.
*G06F 21/00* (2013.01)

(52) U.S. Cl.
USPC .................................. 726/2; 713/182; 380/247

(58) Field of Classification Search
USPC .............. 726/2–4, 16–17; 713/170, 182–185; 380/247–250; 705/64–67, 14.37, 705/14.38, 12, 43
See application file for complete search history.

(56) References Cited

U.S. PATENT DOCUMENTS 5,694,471 A * 12/1997 Chen et al. ..................... 705/76
2004/0124966 A1 * 7/2004 Forrest ........................... 340/5.8
2005/0273626 A1 * 12/2005 Pearson et al. ............... 713/186

OTHER PUBLICATIONS

Rachna Dhamija et al: "The Battle Against Phishing: Dynamic Security Skins" Symposium on Usable Privacy and Security (SOUPS), Jul. 6-8, 2005, Pittsburgh. PA, USA, Jul. 6, 2005, pp. 1-12, XP007913743 * the whole document *.
"Chapter 10: Identification and Entity Authentication ED—MENEZES A; Oorschot Van P: Vanstone S" [Online] Oct. 1, 1996, Handbook of Applied Cryptography; [CRC Press Series on Discrete Mathematices and Its Applications], CRC Press, Boca Raton, FL, US, p. 365-424, XP001525010 ISBN: 978-0-84493-8523-0 Retrieved from the Internet: URL:http://www.cacr.math.uwaterloo.ca/hac/> paragraph [10.3.2]—paragraph [10.3.3].
Dhamija, R. et al. The Battle Against Phishing: Dynamic Security Skins. Symposium on Usable Privacy and Security (SOUPS), Jul. 6-8, 2005 Pittsburgh, PA USA, Jul. 6, 2005.
Menezes, A. et al. Chapter 10: Identification and Entity Authentication ED. Handbook of Applied Cryptography. CRC Press Series on Discrete Mathematics and Its Applications. CRC Pres, Boca Raton, FL USA, 1997.

* cited by examiner

*Primary Examiner* — Philip Chea
*Assistant Examiner* — Kendall Dolly

(57) ABSTRACT

The present invention relates to fraud prevention and authentication of a device to a user. The method of authenticating a personal device according to the invention comprises a set up sequence, wherein at least a first preferred output format is selected by the user, and a device configuration verification sequence. In the device configuration verification sequence a checksum is calculated and converted to a user friendly output format based on the user selected preferred output format. In addition the checksum may be calculated based on variable, and user selectable, keying material. The personal device, after being authenticated according to the above, may be used to authenticate a second device.

22 Claims, 7 Drawing Sheets

METHOD AND ARRANGEMENT FOR USER FRIENDLY DEVICE AUTHENTICATION

FIELD OF THE INVENTION

The present invention relates to fraud prevention and authentication of a device to a user. In particular the invention relates to a method and arrangement for user friendly device authentication.

BACKGROUND OF THE INVENTION

Authentication, identification and authorization have become increasingly important in almost all aspects of man-machine interaction, since access rights to valuable or sensitive data typically cannot be verified physically. The applications spans from everyday life situation as using an automatic teller machine (ATM) and securing the privacy using wireless communication systems, to protecting government or industrial secrets and ensuring safe transactions in commerce.

Great attention has been given to the area of identifying and authorizing a person for granting access to a computer system or certain premises, for example. The methods and arrangements includes using personal identification numbers (PIN), various biometrical devices/methods, as for example automated fingerprint or face recognition. These methods and arrangements are characterized by that a person is identifying herself to a device, and the device, typically through the use of various software means, grants access to the use of the device, access to certain premises or access to a database, for example.

An area which has been given considerably less attention, but which is of increasing importance, is the authentication of a device or system to a user. In many circumstances a user needs a verification that a device is what the user believes it is and/or that a system has not been tampered with. This is further illustrated by the following examples:

Example 1

Fraud has occurred where false ATM machines have been deployed. Users enter their magnetic card and their PIN. Unbeknownst to the user, the ATM scans the magnetic strip and records the PIN before ejecting the card with a "technical error" message. As a consequence, the "owner" of the fake ATM can create a copy ATM card and withdraw money in the name of the real user. All ATMs look basically alike, and it is very difficult to detect a fake one.

Example 2

A user is about to execute a computer program for some sensitive application, such as an account maintenance program in a large bank. It is of utmost importance that the program/computer has not been tampered with, since otherwise, devastating effects could be caused by malicious transactions between different accounts. In fact, it may be very hard to verify that the computer has not been replaced by an identical machine with a Trojan. In principle, authenticity of the program can be checked by computing a checksum of the program code; e.g. a digital signature and/or a hash value assuming the platform is sufficiently trustworthy in itself. E.g. the checksum computation itself must be "tamper proof". Still, this checksum must by necessity (due to security) be a long, completely random looking binary string and it may be quite painstaking to manually verify this character by character.

Example 3

A user leaves his mobile phone unattended while going for a coffee break. When he gets back, how can he be really sure it is his phone, and not an (almost) identical replacement? It could take quite a while before the user notices the replacement. At that time, the user may already have entered some sensitive personal information into the device, which is immediately forwarded to a malicious party.

It should be noted that the requirement in some of the above examples that the user enters a PIN cannot be used to authenticate the device, since a fake device, for example a fake ATM or a fake phone, could be made to simply accept all PINs.

Considerable efforts have been made to specify a trusted platform architecture, for example TCG (Trusted Computing Group, https://www.trustedcomputinggroup.org) to reduce risk of viruses, leakage of information etc The achievements are significant, but do not in any way address the issue how a user, even if he trusts his device, can verify that it is really his device he is using.

Many computer applications output "checksums" (random-looking strings) that the user can observe on the screen, for the purpose of verifying the authenticity of a computer or an application. To have any security, the checksum must be quite long. Currently, the checksum is verified by the user by scanning it letter by letter, digit by digit, which is a tedious task. In addition, it makes it likely that the user needs a paper copy of the checksum written down, which could be lost or stolen. Whence, a fake program can be created.

The problem of authentication of a device to the user is addressed by Asokan et al in "*Authentication of public terminals*", Computer Networks 31 (1999) 861-870, Elsevier. The principle steps are illustrated in the schematic message flow scheme of FIG. 1. A user (U) 105 is in the possession of a trusted personal device (T) 110, and has the intention to use an untrusted device (D) 115, for example an ATM, which is connected to a server (S) 125 via a communication network (CN) 122. The following steps are described:

150: The trusted device 110 is connected to the untrusted device 115 by remote means, for example infra red, or by physical connection,

155: The user 105 request the trusted device 110 to authenticate the device D it is attached to.

160: The trusted device 110 request the untrusted device 115 to authenticate itself to the server 125.

165: The untrusted device 115 runs a one-way authentication protocol to the server 125. If succeeding, an authenticated channel is established between the server 125 and the untrusted device 115, which in the figure is indicated by a double line.

170: The server 125 runs a one-way authentication protocol to the trusted device 110. If succeeding, an authenticated channel is established between the server 125 and the trusted device 110.

175: The server 125 sends a message "D is authentic" to the trusted device 110. In addition the server 125 may send additional information such as session keys or certificates to be used by the trusted device 110 and the untrusted device 115 to construct a secure channel between 110 and 115.

180: The trusted device 110 informs the user 105 that the untrusted device 115 is in fact authentic according to the server 125.

The method taught by Asokan et al. can be seen as ensuring that the two devices 110 and 115 have established secure connections to the server 125, and the user 105 will be warned if the untrusted device 115 is indeed fake and the server 125 is authentic, and the device 110 is indeed the user's own trusted device. A first limitation of this method is that it requires a trusted (third party) server, i.e. the fact that the user has his/her own personal device does not suffice, no matter how trustworthy said personal device is. Moreover, the method does not address how the user can be sure the device 110 is indeed the user's own device which is crucial to make the method robust. Therefore, the method is clearly not effective if both the device 110 and also the server 125 are fake, i.e. the untrusted (fake) device 115 and the (fake) server 125 are part of the same fake network and the device 110 has been replaced by someone in control of said faked network. It should be noted that a fake network does not in reality have to comprise separate entities, it could typically be comprised in the untrusted device 115, but structured to have the appearance of a complete network to the device 110 and hence the user 105. Hence, a fraudulent person could with little more effort than needed to just put up a fake terminal, surpass the security provided by the teachings of Asokan et al.

In "*Visual Authentication and Identification*" by A. Naor and B. Pinkas, *Proceedings of Crypto* 1997, Lecture Notes in Computer Science vol 1294, pp. 322-336, Springer Verlag, a verification output from a device or application, for example a long checksum as in the above described example, is converted to a graphical representation. The graphical representation preferably has a random appearance when viewed on the display of the device, but if viewed through a correct pre-produced overlay slide a sensible image appears, which will be easier for the user to recognize than a long sequence of characters/digits or a random image. The method has the limitation that a user has to carry around the pre-produced slide in order to verify a device, with the obvious risks of the slide being lost, stolen or subject to being worn down which could impair its function. If the security is increased by changing images, the user has to carry a set of slides, and/or have means available to produce new slides. In addition the method only provides a verification method that is dependent on the (assumedly quite good) eyesight of the user, and offers no alternative verification means that might be more suitable for the user. The method is also restricted by practical applicability by the fact that in order to use the same slide for n>1 authentications, the slide's size will become larger and larger as n grows. The main benefit of the method is predominantly of theoretical nature in that one can formally/mathematically prove the security of the method.

It is also known in the art to convert checksums to other user friendly format than the above exemplified graphical format, for example to longer text strings comprising readable words. Although longer, the series of real words will to most persons be easier to remember than a string of random numbers. The process of converting to a longer, but more readable format, is sometimes referred to as inverse Hashing.

Thus, it is illustrated that methods and arrangements are needed to securely, yet in a user friendly manner, authenticate a device to a user, not only the opposite. The in the art proposed arrangements and methods have significant drawbacks in that they do not protect from more elaborated fraud and/or requires the user to keep and carry paper copies of checksums or graphical slides and in that the prior art methods take for granted that the user has already obtained some assurance on the trustworthiness of a personal device, a server, and/or other information, and do not address how that crucial initial trust is established.

SUMMARY OF THE INVENTION

Significant shortcomings of the prior art are evident from the above. Hence, it would be desirable to find a method and an arrangement to authenticate both a personal device and a public device which is both secure and convenient.

The object of the invention is to provide a method, a personal device and a public device for increased security and convenience in authenticating these devices to a user. This is achieved by the method as defined in claim 1, the personal device as defined in claim 21 and the public device as defined in claim 25.

The problem is solved in that the present invention provides a method of authenticating at least a first device, the personal device, to a user. The method comprises a set up sequence, wherein at least a first preferred output format is selected by the user, and a device configuration verification sequence. In the device configuration verification part a checksum is calculated and converted to a user friendly output format. The conversion is at least partly based on the selected preferred output format.

To further increase the security the checksum may be calculated based on a plurality of keying material provided within the personal device. The selection of keying material is variable and preferably specified by the user in the set up sequence.

According to further aspect of the invention the personal device, after being authenticated according to the above, is used to authenticate a second device, a public device. The method in the personal device of authentication the public device may comprise the steps of:

receiving an external checksum transferred from the second device, and converting the transferred external checksum to a user friendly output format.

Alternatively, the personal device stores one or more a transferred initial checksum from the public device(s), and on consecutive encounters between the personal device and the public devices, the personal device compares consecutive checksum(s) transferred from the public device(s) with the initial checksum(s). If the initial and consecutive checksums do not agree the personal device issues a warning message to the user.

Thanks to the invention it is possible to provide a method of authenticating both a personal device and public devices to user in an effective and user friendly way.

One advantage of the invention is that the user does not need to carry around notes of verification numbers or slides for verifying devices.

A further advantage is that the checksum used for verification is converted to a user friendly format of the user choice. In that way the chances that the user will detect an anomaly, i.e. an indication that the device has been tampered with, is greatly increased.

A further advantage is that the personal device, then being authenticated according to the present invention, can be used for authenticating other (public) devices.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE FIGURES

The features and advantages of the present invention outlined above are described more fully below in the detailed description in conjunction with the drawings where like reference numerals refer to like elements throughout, in which.

DETAILED DESCRIPTION OF THE INVENTION

Embodiments of the invention will now be described with reference to the figures.

Figure 1:
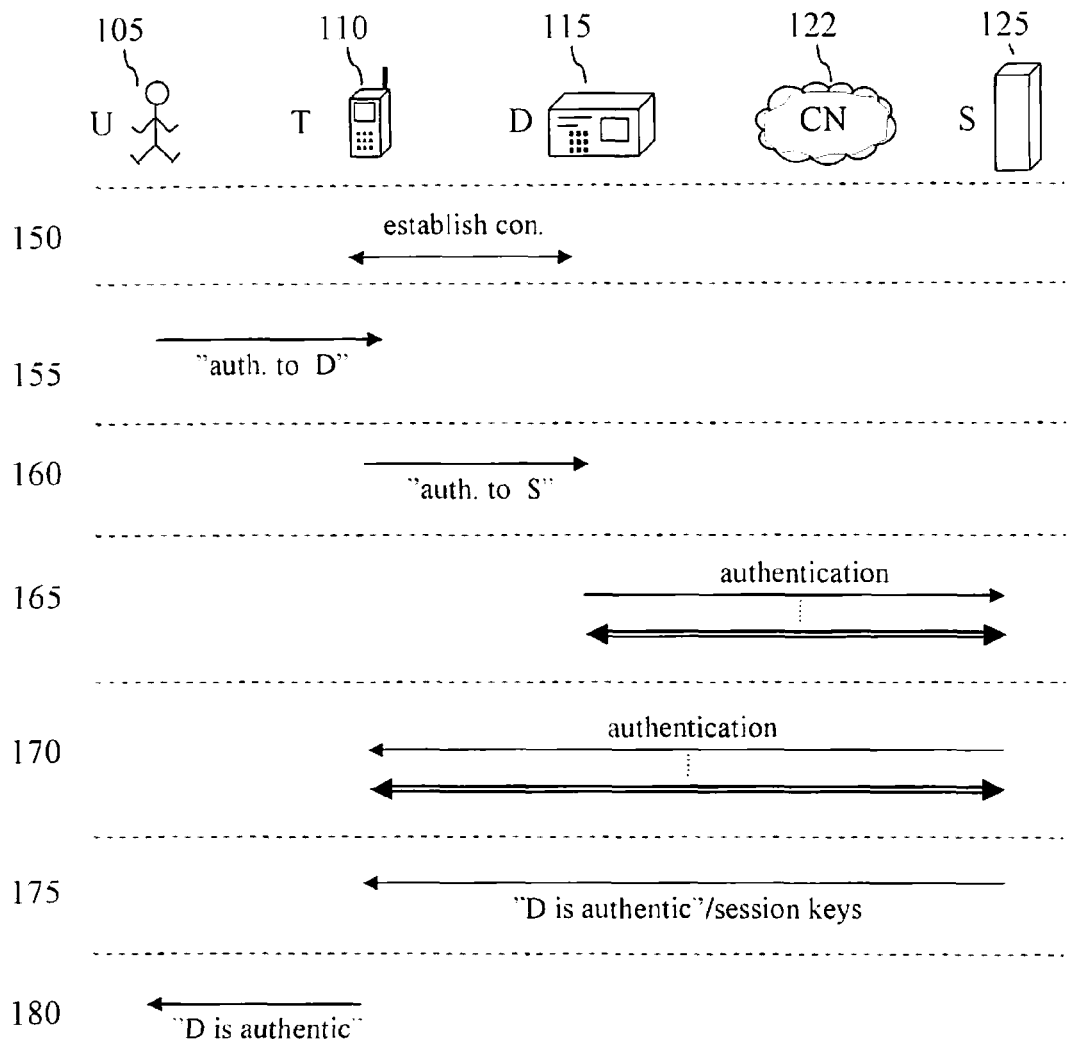
FIG. 1 is a schematic message flow scheme according to prior art.
Figure 2A:
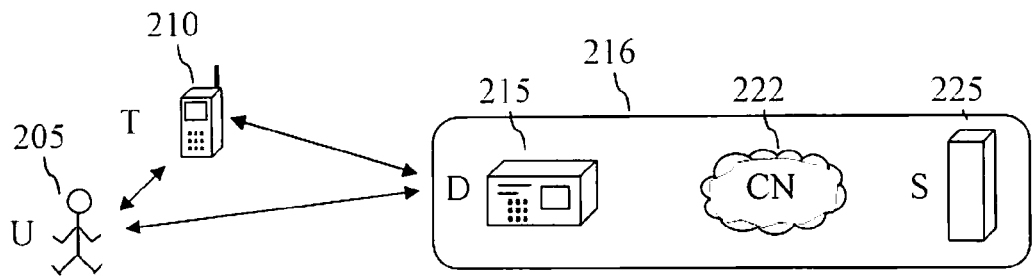
FIG. 2a is a schematic illustration of scenario in which the present invention is used, 2b is a schematic illustration of a trusted personal device according to the present invention, and 2c is a schematic illustration of a public device according to the present invention.

An exemplary scenario wherein the method and arrangement according to the present invention is utilized is schematically illustrated in FIG. 2a. A user (U) 205 uses a personal device (T) 210, for example a mobile terminal, and has the intention to use a public device (D) 215, for example an ATM, which is connected to a server (S) 225 via a communication network (CN) 222, forming public system 216. Alternatively the public device 215 is a stand alone unit without permanent connection to other units. The personal device 210 may for example be a computer, a mobile phone/mobile terminal or an device dedicated for purpose of communicating with for example ATM-terminals. The personal device 210 is provided with inputting means and preferably a plurality of outputting means, such as a display capable of both graphical and textual output, sound generation means and a vibrating alert. The first embodiment of the invention addresses a method and arrangement to ensure that the personal device is to be trusted. The public device/public system 215/216 is initially not authenticated to the user. Further embodiments of the invention addresses how to authenticate the public device with aid of the now authenticated personal device 210. Example of public device/public system 215/216 includes, but are not limited to: ATM, personal computers (PCs) and other consumer electronics, vending/ticket machines, medical apparatus, automatic door locks, motor vehicles, devices for e-government (e.g. electronic voting booths), slot-machines and other types of gambling/gaming machines, etc.

The user 205 typically interacts both with the personal device 210 and the public device 215 or the public system 216, which in the figure is indicated with arrows. The personal device 210 interacts with the public device 215 or the public system 216.

The method of authenticating a personal device 210 according to the invention comprises a set up sequence wherein at least a first preferred output format is selected by the user, and a device configuration verification sequence. In the device configuration verification sequence a checksum is calculated and converted to a user friendly output format based on the preferred output format selected by the user. In addition the checksum may be calculated based on selectable, by the user or randomly generated, keying material. The personal device 210, after being authenticated according to the above, may be used to authenticate a public device 215. In this case a checksum is transferred from the public device 215 to the personal device 210, and converted, in the personal device, to a pre-selected output format. Alternatively the personal device 210 stores, compares, and verifies checksums from public devices 215 automatically, and the user is only alerted if the personal device detects a discrepancy.

The personal device 210 should preferably be built on a trusted platform architecture in order to provide the wanted level of security. Such platform is provided by the previously mentioned TCG and the respective device profiles thereof. Similar security technologies can also be envisaged as suitable for the personal device 210. TCG is known in the art, and the personal device 210 being specified according to TCG profile(s), or similar technology, should not be regarded as part of the invention. However, as the concept of a trusted platform architecture is of importance for carrying out the invention at a higher level of security, some main features of TCG will be briefly described.

TCG provides secure, tamper resistant storage of keys and other sensitive information. Certain sensitive operations (e.g. using keys) can be performed in such a way that one gets high confidence that only authorized system components can access keys etc, and that the result is correct.

TCG can help to verify that a computer system is configured as one expects. I.e. it can provide some integrity verification of the present device/system configuration, e.g. that important functions are intact and free of malware. A specially important aspect of this is creating trusted paths, e.g. making sure that what is entered on the keyboard really reaches the application, and that the output of a computation agrees with what is actually displayed.

The personal device 210 is preferably TCG enabled. In the following, it is assumed that the personal device 210 is TCG enabled, or provided with a technology providing the same or higher level of security. The invention is applicable also without this assumption, but a secure platform architecture is preferred to give a high overall security.

It also assumed that some way to convert random data into user-understandable information is present, e.g. converting random data to images, audio, text, or similar. Examples of suitable algorithms for the conversion of random data into user-understandable information are given below.

As described in the background section, TCG and the cited prior art do not provide sufficient means of ensuring a user the authenticity of a device. A first embodiment of the invention provides a method and arrangement for ensuring the user that a personal device is to be trusted, i.e., that it indeed is the personal device and not a fraudulent replacement or "clone" thereof. This embodiment of the invention will be described with reference to the schematic illustration of a personal device depicted in FIG. 2b and the flowchart of FIG. 3.

Figure 2B:
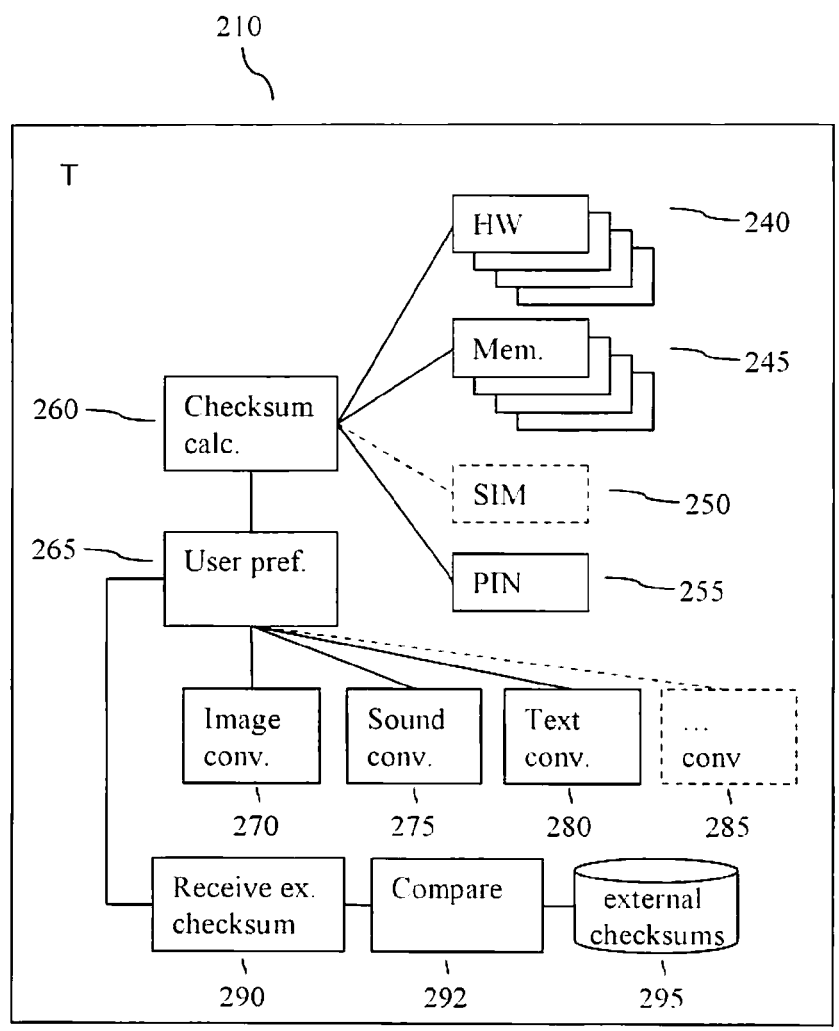

A personal device 210 according to the present invention is schematically illustrated in FIG. 2b. The modules and blocks are to be regarded as functional parts and not necessarily as physical objects by themselves. The modules and blocks are at least partly preferably implemented as software code means, to be adapted to effectuate the method according to the invention. The term "comprising" does primarily refer to a logical structure and the term "connected" should here be interpreted as links between functional parts and not necessarily physical connections. However, depending on the chosen implementation, certain modules may be realized as physically distinctive objects in the device, and this might in some cases be preferred from a security point of view.

The personal device 210 comprises a plurality of modules which has identification means, possibly unique, ascribed to them. Such modules include, but are not limited to, hardware modules 240 and memory modules 245. One memory module 240 could for example contain a unique identification number of the device itself. If the device is a mobile terminal, it will in addition comprise a SIM-card 250 (or equivalent) which can provide identification numbers. The device 210 may also have a code module 255 for receiving a code from a user, for example a PIN-code, and the currently entered PIN code, possibly together with other information, is considered the identification number of this module. These modules have, at least some of them, the capability to provide identification means, most preferably in the form of a number, and will be referred to as identification modules 240-255. The total set of identification means used in a particular scenario, which can be used to calculate a checksum will be referred to as keying material. To clarify further by example, the user's entered PIN code together with a device hardware identifier, or some function of these, is one example of keying material. This is merely an example, and the same device could, in another scenario, use different identification means to form the keying material. In connection with the identification modules 240-255 is a checksum module 260 for calculating a checksum based on the keying material provided from the identification modules 240-255. The checksum module 260 is in connection with a user preference module 265, adapted to receive and store the users preference in how the calculated checksum should be presented to the user. The user preference module 265 is connected to a plurality of conversion modules 270-285, and directs the checksum to the conversion module 270-285 corresponding to the preferred output format. Examples of conversion modules, typical to be found in a personal device, are an image conversion module 270, a text conversion module 275, and a sound conversion module 280. Various other types of conversion modules, indicated with conversion module 285, for example adapted for speech generation may be envisaged. In the conversion modules 270-285 a checksum is converted to specific user friendly formats. The conversion modules are in turn connected to usual means for presenting the result to a user, for example a display or sound circuits (not shown).

According to further embodiments of the invention the personal device 210 is utilized to authenticate also public devices 215. For this purpose the personal device may preferably be provided with a receiving module 290 for receiving an external checksum from a public device. The receiving module 290 may be connected to the user preference module for converting the received external checksum to a user friendly format. Alternatively the receiving module 290 is connected to a comparison module 292 which in turn is connected to a memory or database of external checksums 295. The comparison module 292 is adapted to compare a received checksum with previously stored checksums retrieved from the memory/database 295.

Figure 2C:
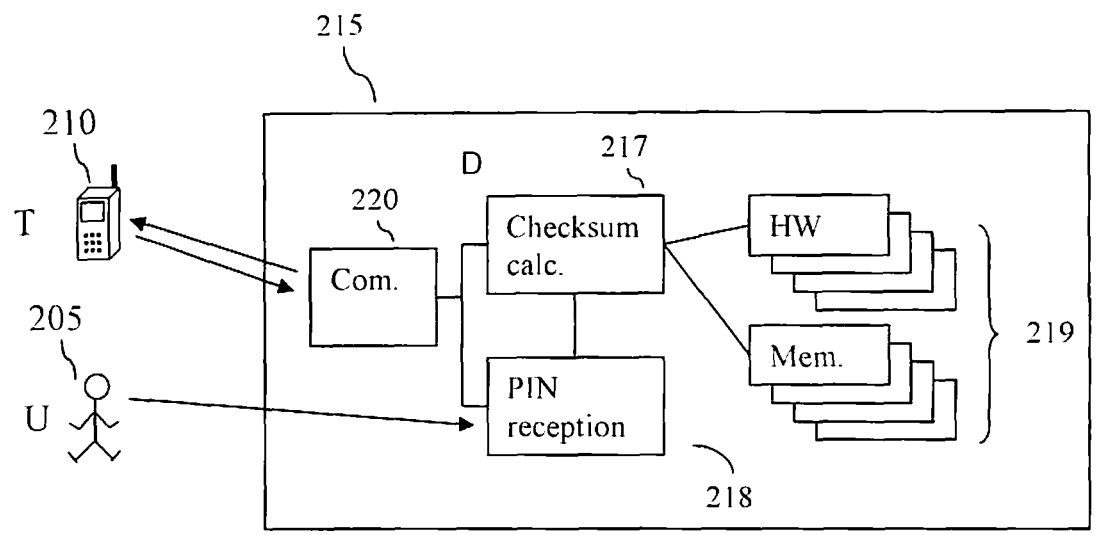

A public device 215 according to the present invention is schematically illustrated in FIG. 2c. The public device 215 comprises a checksum calculation module 217 which is in connection with at least a PIN reception module 218. The checksum calculation module 217 and the PIN reception module 218 is preferably in connection with a communication module 220 adapted for transferring of data to and from the personal device 210. The PIN reception module 218 is adapted to receive a PIN, or other code, from the personal device 210 or from the user 205. The checksum calculation module 217, stores, or can retrieve, an internal secret unique to the public device 215. The checksum calculation module 217 may additionally be in connection with one or more identification modules 219, for example hardware and memory modules capable of providing identification means which can be used as keying material.

Figure 3:
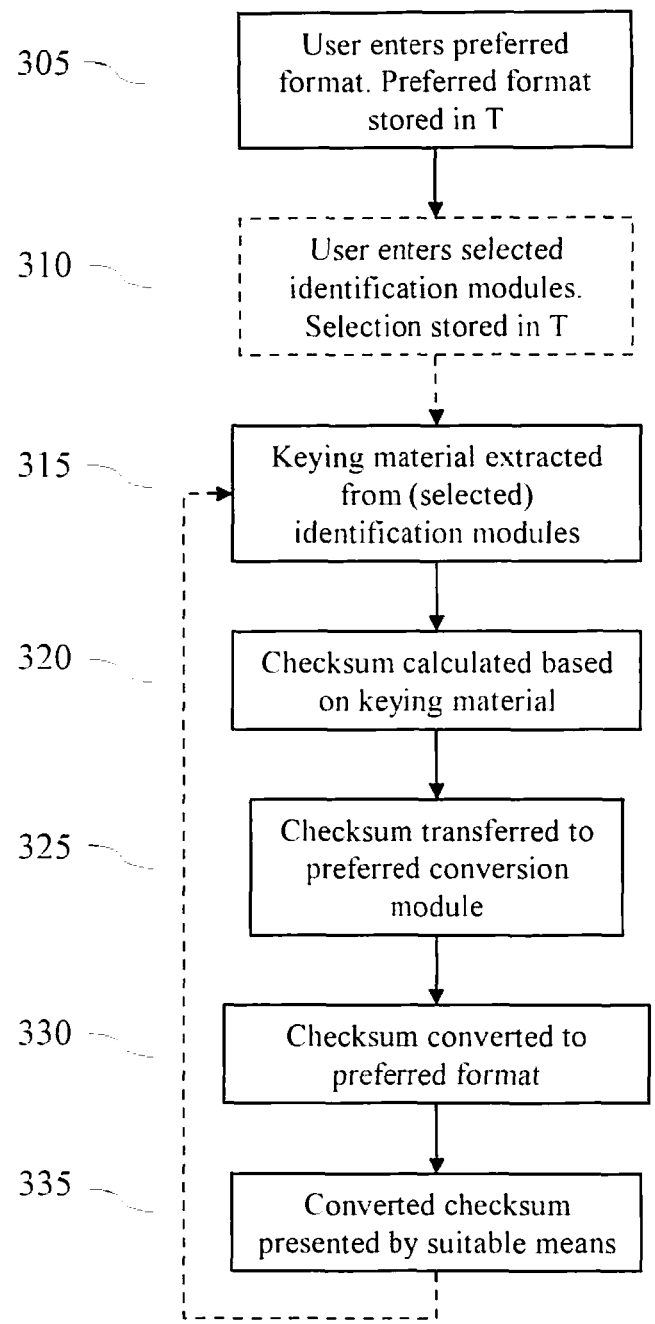
FIG. 3 is a flowchart of the first embodiment of the method according to the present invention.

The method according the first embodiment of the invention, illustrated in the flowchart of FIG. 3, comprises the steps of:

305: The personal device 210 receives and stores at least one preferred output format selected, by the user 205, among the user friendly output formats available in the device. The preferred output format indicates to which user friendly format a checksum should preferably be converted.

310: Optionally the user decide which of the available keying material should be included in the checksum. The selection is received and stored by the personal device 210. Preferably the options, based on the available keying material in the device, are presented to the user in a user friendly way. Alternatively the selection is random or predetermined.

315: The keying material is extracted from the (selected) identification modules comprised in the personal device 210.

320: A checksum is calculated based on the keying material.

325: Based, at least partly, on the preferred output format (step 305) the checksum is transferred to the corresponding conversion module 270-285.

330: The selected conversion module 270-285 corresponding to the preferred output format convert the checksum to a user friendly format.

335: The result of the conversion is presented to the user by suitable means, for example graphically on a display or by playing a sequence of notes through a speaker or ear-phone.

The steps 305-310 which will be referred to as the set up sequence, is typically executed in a set up or configuration scenario. Alternatively the user may activate this sequence to change the preferred output, or the way the checksum is calculated.

The steps 315-335, which will be referred to as the device configuration verification, are repeated, which is illustrated by the dashed line, at least at booting of the personal device 210, and optionally and preferably also at intervals during operation of the device. The device configuration verification may also be activated if the user wants to check the authenticity of the device, for example after leaving the device unattended for some time.

In addition to the keying material used in step 320, which can be seen as keying material relating to the relatively static configuration of the device, the method may comprise also keying material relating to applications to be executed on the trusted personal device. If, for example, the user uses the personal device for executing a communication application a checksum is calculated based on keying material also including an ID, code or checksum associated with that application. Prior to using the application the user activates the device configuration verification relating to that application and will be presented with the converted checksum for his acknowledgement. A second application will result in a different checksum, and hence a different presentation. Thereby, in this embodiment, the method according to the invention is extended to also comprise a verification of applications, wherein the verification will be unique for each application.

The improved security afforded by the method and arrangement according to this embodiment is accomplished both by the way the checksum is calculated, based on a plurality and a variable set of keying material, and by the fact that the checksum is converted to a format that is easier to recognize for a user than a long sequence of numbers, and not at least that the format is a by the user preferred format. This is due to the fact that most humans finds it easier to remember for examples a sequence of notes, which will be perceived as a short tune or song, than a displayed checksum. If the device have been tampered with, or replaced, the resulting tune will be different, a variation that a user normally will have no problem of detecting. If the user so prefers the result will be outputted for example as a graphical image, also that a format wherein most persons can detect changes. The capability of the present invention to adapt the output format in accordance to the user preferences is of particular importance for disabled persons. For example, a hearing disabled person can use a graphical presentation, and a visually disabled person an audio presentation.

In a mobile phone, part of the computation and/or part of the keying material could be located in the SIM, e.g. within the SIM Application Toolkit (SAT), for even higher protection.

A possible problem with audio is that it could be recorded by nearby devices for later playback. Thus, an image on a small screen may be preferred, or alternatively, the audio is rendered dependent on whether earphones/handsfree is connected or not (mobile phones will usually detect this automatically). Hence, step 325 is modified so that also additional parameters are considered in combination with the preferred output format in determining which user friendly format (which conversion module 270-285) that should be used. The additional parameters may for example reflect the current configuration of the personal device 210. Alternatively the user may specify more than one preferred output formats: the first to be used if the personal device 210 is in a first configuration, a second preferred output format to be used if the personal device 210 is in a second configuration etc.

Optionally, if the device is shared between a small number of users, e.g. a family, each user could enter a distinct PIN, and that PIN is made part of the checksum computation. Thus, each user will get a different checksum/song/image. In addition, each user could have its own distinct preference for the presentation format.

The user is now provided with a truly trusted personal device 210. In the following it will be assumed that the user's personal device 210 is trustworthy in the sense of the first embodiment of the invention Assuming the user has a personal device which is trusted and already authenticated this can be used to bootstrap authentication also of non-personal devices, refereed to as the public device 215. As a simple non-limiting example, it is assumed that the external device is a (preferably TCG enabled) ATM, though one can easily see how to extend to other devices such as for instance personal computers (PCs) and other consumer electronics, vending/ticket machines, medical apparatus, automatic door locks, motor vehicles, devices for e-government (e.g. electronic voting booths), etc.

In principle, it is preferred that the ATM computes a checksum that is securely transferred (e.g over IR or Bluetooth) to the personal device for verification. Since the user's device is trusted, the user device could perform the verification on behalf of the user (comparing to the expected checksum), not involving any random conversion at all, or alternatively the conversion is performed in the personal device, resulting in a presentation to the user in a user friendly format. It is preferred to transfer "raw" random data from the ATM to the trusted personal device, since the personal device can then implement the conversion method that this particular user prefers. Some users may prefer audio, others an image etc. This avoids the need to implement many user-specific conversion functions in the ATM, and to provide the ATM with a large variety of output means.

The checksum produced by the ATM should preferably be personalized, so that it is specific not only to the ATM, but also to the current user. This may be performed in several ways. A simple way is to let the checksum also depend on the user's entered PIN, or some function thereof. An alternative method is to let the user's personal device generate and transfer the PIN, or some other code which can then be very long, for higher security.

A second embodiment of the invention, addressing the above described bootstrap scenario will be described with references to FIG. 2a and the schematic message flow illustration of FIGS. 4a and b. The public device 215, may be a stand alone unit or a part of a public system 216. In the following, the term public device 215 exemplifies both a stand alone device and a public system 216. Examples of public devices/systems that initially is not authenticated to the user include, but is not limited to: consumer electronics such as PCs, printers and fax machines; apparatus/systems relating to financial transfers such as ATMs, vending/ticket machines, and automated credit card systems; medical apparatus; automatic door locks; motor vehicles, devices for e-government e.g. electronic voting booths, games/gambling machines, etc.

Figure 4A:
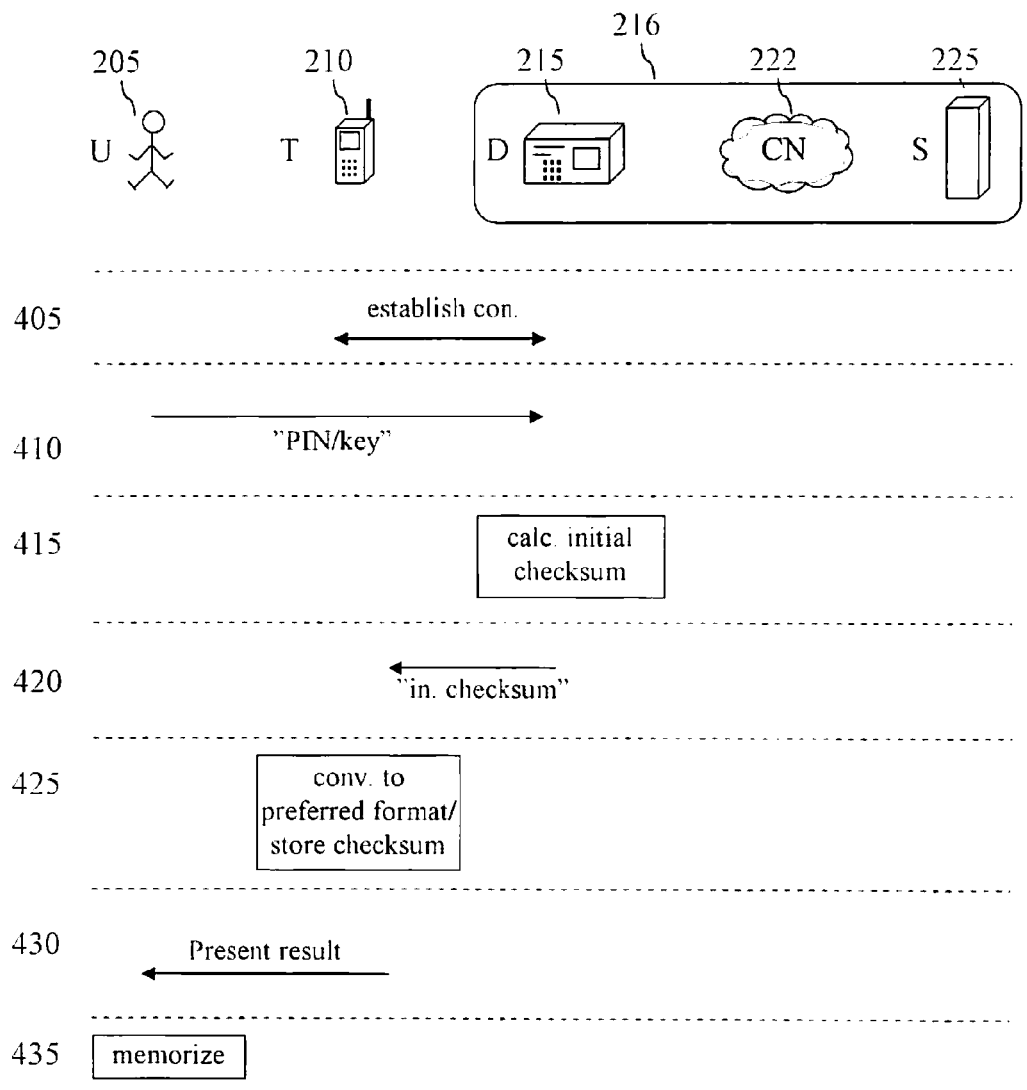
FIG. 4a is a schematic message flow scheme of an initial part of an embodiment of the invention, 4b is a message flow scheme of an consecutive part of the method and 4c is a message flow scheme of an consecutive part according to an alternative embodiment of the invention.

On a first encounter with the public device 215, an initial part of second embodiment, depicted in FIG. 4a is performed and comprises the steps of:

405: D⇔T: The personal device 210 and the public device 215 establish secure connection (e.g. Blutetooth, IEEE 802.11i, etc).

410: U⇒D: The user 205 enters a PIN, or other "key", to the public device 215.

415: D: The public device 215 compute an initial checksum based at least on an internal secret and the entered PIN. In addition, and similar to how keying material is extracted in the personal device 210, the keying material may include other identification means of D, for example identity(D), other_internal info(D), and external info(D).

420: D⇒T: The public device 215 transfer the calculated initial checksum to the personal device 210.

425: T: The personal device 210 perform user friendly conversion of the transferred initial checksum and possibly other optional data. Thus, the initial checksum provides at least part of keying material for authenticating the public device 215. By "part of" it is to be understood that besides the key material directly provided by the public device 215, also keying material supplied internally by T itself may be used. This has the advantage that even if some time has elapsed since the initial authentication of T towards U took place, an "implicit" re-authentication of T will now automatically take place, increasing confidence. If "external info(D)" was used, this is verified as well (see below). The conversion follows the method of the first embodiment and comprises the steps of:

425:1 Based on the preferences of the user (step 305) the transferred initial checksum is outputted to the conversion module 270-285 corresponding to the stored user preference.

425:2 The conversion module 270-285 corresponding to the stored user preference convert the transferred initial checksum to a user friendly format.

Alternatively the initial checksum and/or the converted initial checksum is stored by the personal device 210 in a memory or database 295.

430: T⇒U: The personal device 210 present the result of the conversion to the user 205 by suitable means, for example graphically on a display or by playing a sequence of notes through a speaker.

435: U/T: The user 205 remembers the converted representation of the transferred checksum for future.

In step 410, the "PIN" could be chosen by the personal device 210 to be another PIN, independent of the "real" user PIN and transferred from the personal device 210 to the public device 215. This has some advantage in that the user 205 does not need to expose his "real" PIN until after he is certain of the authenticity of the device. The personal device 210 would then store the PIN for future use. This also makes it possible to use longer, more secure PINs.

In step 415, the "external info" could for example be information provided by a trusted third party, e.g. a "domain certificate", issued by the bank or the machine vendor in the ATM case, signing some information specific to the public device 215. This enhances security on the initial authentication, and is typically not needed in consecutive encounters.

If in step 425 the alternative of storing the initial checksum or the converted initial checksum is utilized, the steps 430 and 435 may be replaced with a step whereby the personal device 210 informs the user 205 that it has received and stored an initial checksum. Alternatively, initial checksums corresponding to public devices 215 may have been transferred to the personal device 210 by other means and typically prior to the initial encounter. A bank, for example, may provide a user with a list of all checksums of their ATMs to store in the personal device 210.

Figure 4B:
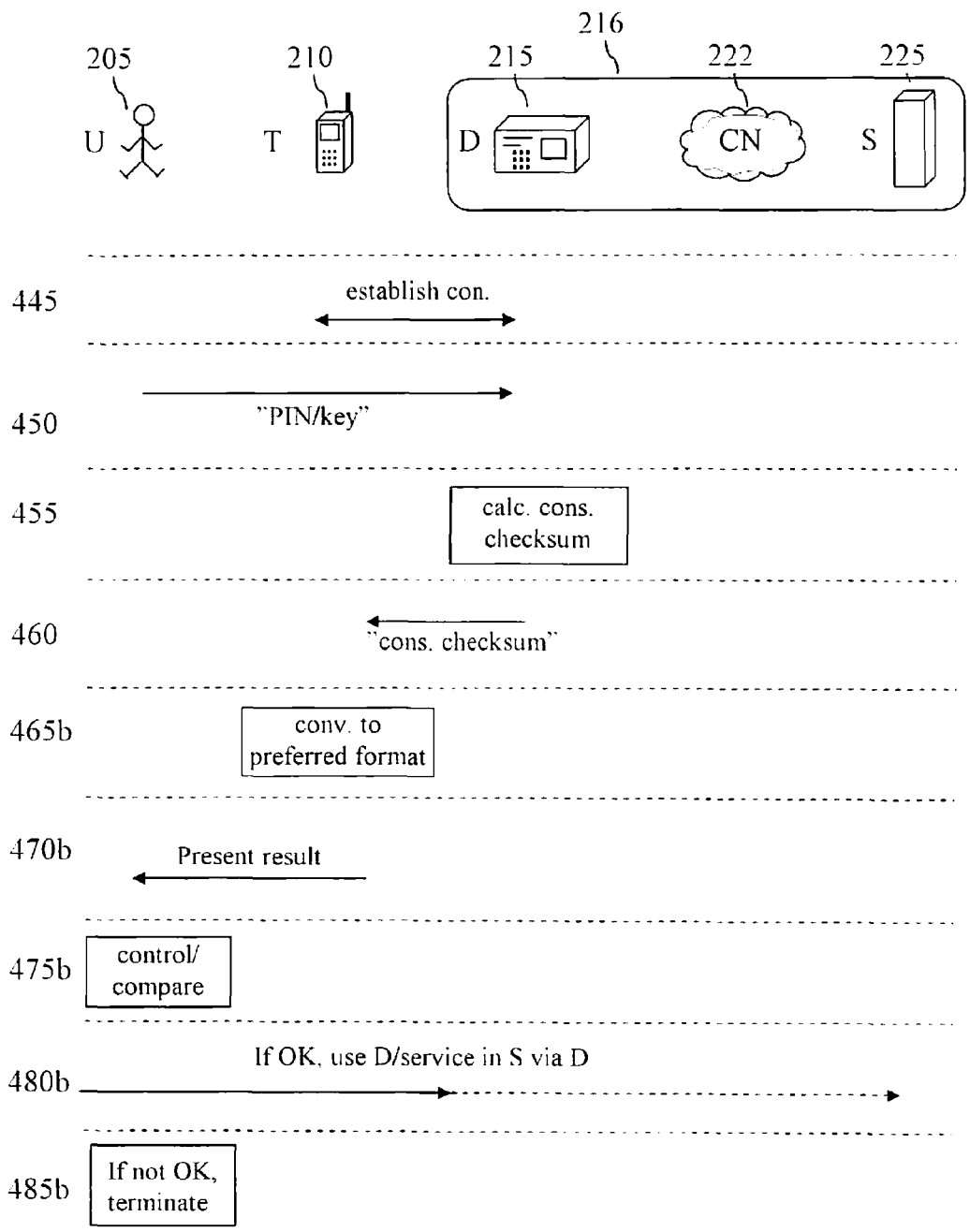

On consecutive encounters with the public device 215, a second part of the second embodiment, depicted in FIG. 4b is performed and comprises the steps of:

445: D⇔T: The personal device 210 and the public device 215 establish secure connection (e.g. Blutetooth).

450: U⇒D: The user 205 enters a PIN, or other "key", to the public device 215.

455: D: The public device 215 calculate a consecutive checksum of internal secret, PIN, [identity(D), other_internal info(D), external info(D)].

460: D⇒T: The public device 215 transfer the calculated consecutive checksum to the personal device 210.

465b: T: The personal device 210 perform user friendly conversion of the transferred consecutive checksum. If "external info(D)" was used, verify this as well (see below). The conversion follows the method of the first embodiment and comprises the steps of:

465:1 Based on the preferences of the user (step 305) the transferred consecutive checksum is outputted to the conversion module 270-285 corresponding to the stored user preference.

465:2 The conversion module 270-285 corresponding to the stored user preference convert the transferred consecutive checksum to a user friendly format.

470b: T⇒U: The personal device 210 present the result of the conversion to the user 205 by suitable means, for example graphically on a display or by playing a sequence of notes through a speaker.

475b: U: The user 205 checks whether the presented converted transferred consecutive checksum agrees with the expected, i.e the memorized converted initial checksum.

480b: If the initial checksum and the consecutive checksum (or their conversions) agrees the user 205 is informed that the public device 215 is authenticated and that it is probably safe to proceed with using the public device 215, typically to utilize services offered by a server 225 via a communication network 222.

485b: If the user 205 detects a discrepancy between the converted the initial checksum and the converted consecutive checksum the user 205 is warned that the public device 215 is not authenticated, and that it is unwise to proceed using the public device 215.

The similar options as in the initial part apply.

It should be noted that in this embodiment, the external checksums, i.e. the initial and consecutive checksum transferred from the public device 215 to the personal device 210, remains in the personal device only for the time needed to convert to the user friendly format, and is then preferably not stored in the device. That is, all data in the user-friendly presentation format is immediately flushed from internal memory of the personal device 210, once rendering has occurred. Instead, the memory of the user, aided by the conversion to the user friendly format of his choice, is utilized on subsequent authentications, following the initial one. This increases the security as it reduces the risk of someone unrightfully getting access to the checksums, either through taking possession of the device or by implanting a virus or Trojan.

Figure 4C:
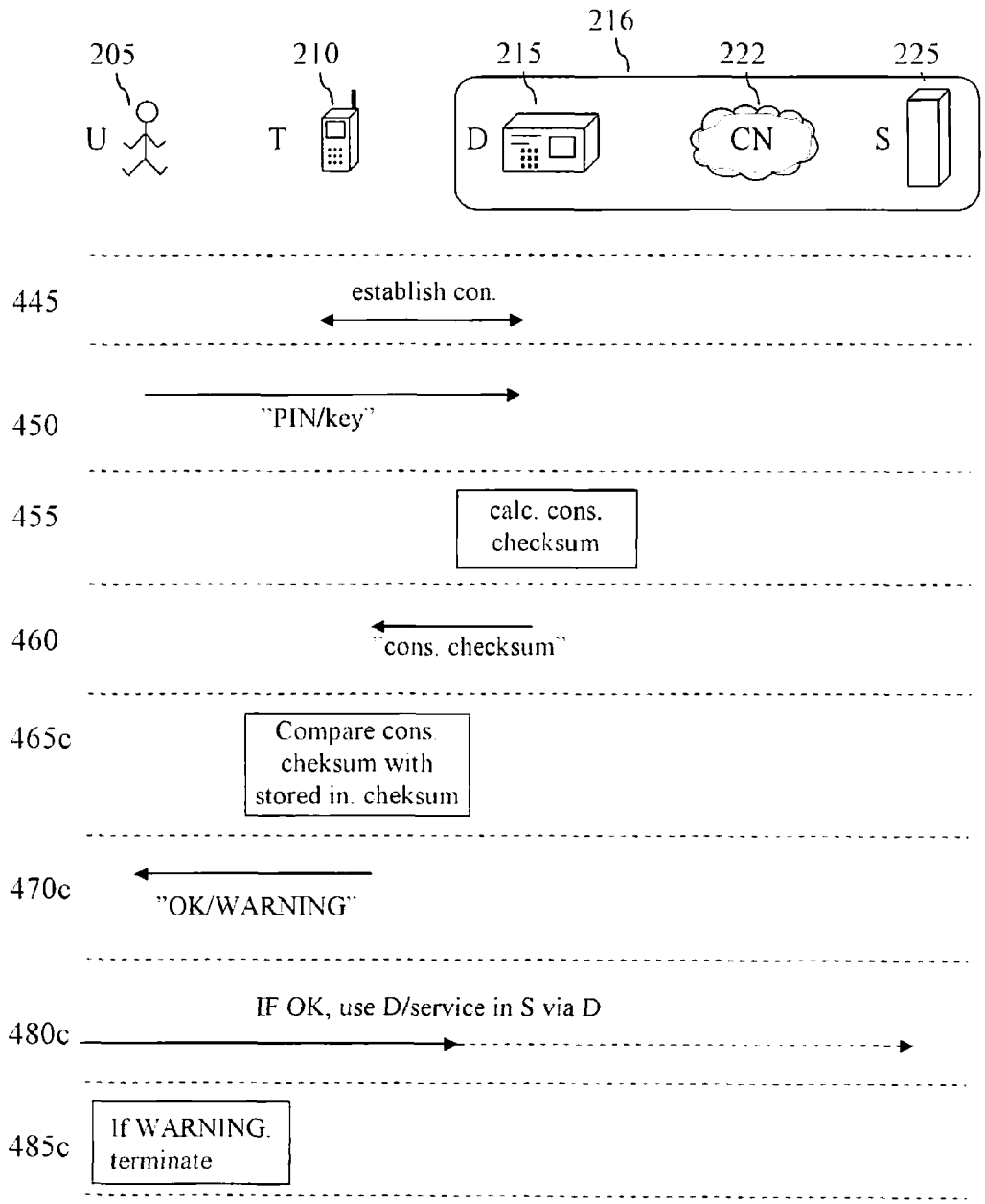

Alternatively the transferred consecutive checksum and/or the converted transferred consecutive checksum is compared with the previously stored (step 435) initial checksum by the personal device 210. This alternative embodiment is illustrated in FIG. 4c and the steps 465b 470b and 485b are replaced by the steps:

465c: T: The personal device 210 compares the converted transferred consecutive checksum with the previously stored (step 435) initial checksum.

470c: T⇒U: If the transferred consecutive checksum agrees with the stored initial checksum the user 205 is informed by an "OK-message" that the public device 215 is authenticated. If the transferred consecutive checksum does not agree with the stored initial checksum the user 205 is warned by an "Warning-message" that the public device 215 is not authenticated.

The personal device 210 may store a plurality of different initial checksums corresponding to a plurality of previously authenticated untrusted devices 215. The database of checksums is preferably indexed by identifiers of the respective public device 215 for ease of retrieval. In step 465 the personal device compares with the plurality of initial checksums stored in the memory/database 295. If the currently transferred checksum does not correspond to any of the stored, the user is warned that the approached public device is either new and not yet authenticated or not to be trusted. This embodiment offers an attractive solution in that the verification is automated and controlled by the personal device 210, and can be made to not involve the user 205 until a warning is issued by the personal device 210. The increased security relies on that the personal device is to be trusted. A fake personal device could, for example, be made to never issue a warning. In this embodiment the use of the device configuration verification (305-335) authenticating the personal device will ensure the user that the comparison of the new external checksum with the stored checksums is not tampered with.

In a further embodiment of the invention, elements of the above two alternative embodiments of storing a plurality of checksums and converting/memorizing a checksum, respectively are combined to form a convenient, yet secure authentication. When a plurality of public devices 215 are to be authenticated, each generating a specific checksum, and comparison is made by the user him/her self, this means that the user will need to memorize a plurality of songs/pictures/texts etc. While this is what adds to the present invention's security, it also implies a slight inconvenience for the user. It is, however, possible to strike a trade-off between security and convenience in this case as will be described. It is for simplicity of the description assumed that all inputs to the conversion modules 270-285 are k bits in size. The ordinary skill in the art will appreciate that different values of k can be supported. Suppose that the public device 215 with "identity" j produces checksum c(j), j=1, 2, . . . and let c be a k-bit value corresponding to a user-selected preferred image/song/text, etc, to be output/rendered. That is, c corresponds to a k-bit value, which, when converted by the selected module (270, 275, 280 or 285 of FIG. 2b), will produce a certain user-preferred image/song/text etc. There could either be a unique c for all devices 215, or, there could be one c for each type of public device 215 (e.g. one c specific for ATMs, one for vending machines, etc). Finally, there is a secret, s, preferably known only by the user and/or the user's personal trusted device 210.

According to the present embodiment, step 425 of storing checksums, is modified/extended as follows:

425d: Together with, or instead of, the transferred initial checksum C(j) for public device j, y(j)=Encr(s, c(j) XOR c), i.e. the value c(j) XOR c, encrypted by the secret s, is stored as an encrypted representation;

and the step of converting to a user friendly format, step 465b is modified as follows:

465d: The conversion of the consecutive checksum, c(j), is modified to be based not on c(j), but rather on C(j) XOR Decr(s, y(j)) (i.e. the decryption of y(j) using key s), which can easily be seen to produce the same value, c, as input to the conversion, independent of c(j).

Thus, the user only needs to memorize one value c (or one value c for each type of device), facilitating the authentication by the use of the users 205 own memory. If the key s is sufficiently protected (e.g. by the user's PIN), since the values c(j) XOR c are stored in encrypted form, they remain safe even if the personal device 210 is lost or stolen. Note therefore that the encryption/decryption may be omitted if sufficient protection (e.g. physical) can be offered by the device 210 itself. Furthermore, other operations, besides the XOR operation can be utilized. For instance, the values stored can be of form y'(j)=Encr(s, (c(j)+c) mod M), and when comparing, (c(j)−Decr(s, y'(j))) mod M, where M is k-bit (or larger) integer, may be utilized. In general, Encr(s, f(c, c(j))) can be stored and g(Decr(s, y(j)), c(j)) is used when converting, where g is the "inverse" of f in the sense that for each c, g(f(c, c(j)), c(j))=c.

Optionally, step 465d may additionally comprise that the personal device 210 first compares c(j) to the stored value before performing the decryption/conversion.

To further increase the security, a step could be added, for example in connection to the establishment step 445, of automatically triggering the device configuration verification (305-335) in the personal device 210. The user 205 will thereby get an automated confirmation that the personal device 210 indeed is to be trusted before proceeding with a potentially sensitive transaction using the public device 215, for example. As mentioned, a similar effect can also be achieved by incorporating into each authentication of a public device 215, also keying material from the personal trusted device 210.

An alternative method of automated verification of the public device 215 involves a cryptographic identification, for example with the use of public and private keys, during the establishment of the connection between the personal device 210 and the public device 215, step 445. Typically both the devices have previously been provided with a certificate from a trusted supplier. Also in this case it is of highest importance for the user that the personal device is to be trusted.

The invention has above primarily been exemplified in scenarios wherein the user is in direct contact with the public device 215 or public system 216, and wherein these devices are utilized directly for the further actions, for example using an ATM to withdraw cash. The inventive method and arrangement is not limited to this usage, also application wherein the personal device 215 is actively utilized for the further actions will benefit from the increased offered security. These applications includes for example the personal device 210 being a mobile phone accessing to a radio access network to set up a speech or data communication. In UMTS, for example, the mobile phone and the access network authenticate each other. In this scenario, thanks to the invention, the user will be ensured that both the mobile phone and the radio access network are authentic, and the risk of the system being "hijacked" without being noticed is effectively reduced.

Implementation Examples

The invention requires methods to convert random, binary strings (checksums) into data easily recognizable by a human. This can be performed in several ways, and below a brief theoretical background followed by alternative implementation examples is given. As can be seen by those of skill in the art, other theoretical framework for converting binary strings to user friendly data, and other practical embodiment of said theory can be used in conjuction with the present invention.

The method may, for someone familiar with computer science, intuitively be thought of as "inverse hashing". The purpose of hashing is to convert long, possibly non-uniformly distributed strings into short, but more uniformly distributed strings. Here a relatively short and random string is turned into a longer, possibly non-random representation. Although the produced string/representation may be non-random among the set of all stings of the same length, it will be demonstrated that the entropy/amount of information can be made to be equivalent to original short string.

A possible method will be formally described: Let N={1, 2, ... } denote the natural numbers. Fix an alphabet $\Sigma$, i.e. a set of symbols, of cardinality b. Fix n∈N and let $\Sigma^n$ consist of all strings of length n over $\Sigma$, so that the cardinality of $\Sigma^n$ is $b^n$. (Typically $\Sigma$ may be {0, 1} so that $\Sigma^n$ is the set of all binary strings of length n.) Let $m(n) \geq j(n) \geq k(n)$ be integer valued functions with $k(n) \geq n$ and let $S_1, S_2, \ldots, S_{m(n)}$ be sets ($S_j$ can be envisaged to contain some human recognizable items, e.g. English words, pictures, sounds, etc.). We have a coding function, $C_n$, mapping $$C_n : \Sigma^n \to S_{r1} \times S_{r2} \times \ldots \times S_{rk(n)}$$

and a redundancy function $$\rho_n : S_{r1} \times \ldots \times S_{rk(n)} \to S_{t1} \times \ldots \times S_{tj(n)}$$

where $t=(t_1, t_2, \ldots, t_{j(n)})$, $t_i \in N$, $t_1 < t_2 < \ldots < t_{j(n)} \leq m(n)$, and where $\rho_n$ is preferably the identity function on each $S_r$, for which $t \in \{r_1, r_2, \ldots, r_{k(n)}\}$. Thus the list/vector r uniquely determines $\rho_n$, and in other words, the inverse $\rho_n^{-1}$ is a projection. Intuitively, $c_n$ converts binary strings to a k(n)-tuple of "user friendly" data items and $\rho_n$ "inserts" additional user-friendly data in certain places. The functions $c_n, \rho_n$ should of course be efficiently computable, and some examples will be given later.

The security of this scheme depends on the mapping $c_n$ as follows. The probability, $$Pr[\rho_n(c_n(x_1)) = \rho_n(c_n(x_2))]$$

(probability over random $x_1 \neq X_2$), should be small for high security, i.e. no two checksums are likely to produce the same human-readable data. Since $\rho_n$ is a redundancy function and assuming it is the identity mapping on the outputs of $c_n$, this probability cannot be greater than $$Pr[c_n(x_1) = c_n(x_2)].$$

In this case, only the choice of $c_n$ thus matters for the security. In cases where high demand on the randomness properties are desired, the following relation between $c_n$ and $\rho_n$ is therefore imposed:

$$\rho_n(c_n(x_1)) = \rho_n(c_n(x_2)) \Rightarrow x_1 = x_2$$

(i.e. restricted to the range of $\rho_n$, $c_n$ is a one-to-one function, which will be further discussed below) to actually guarantee the security. But as noted, it may in practice suffice if the probability that $x_1=x_2$ is small enough, say one in a billion or so. This last property will then, in turn, imply the following requirement on the sizes of the sets (assuming that all input strings over $\Sigma$ are possible): $\Pi_i \text{size}(S_i) \geq b^n$, where the product is taken over the set of i such that $i=r_j$ for some j. The only other restriction (which is difficult to express in absolute mathematical terms) on the sets, $\{S_i\}$ and the function $c_n$ is that when selecting x at random from $\Sigma^n$, the image, $c_n(x)$, should be "easy to remember" for a human.

The idea of the scheme's practical use is as follows. A random n-bit string x is produced, e.g. as the checksum of hardware in a device. $\rho_n(c_n(x))$ is applied to this value, and "shown" to the user. The user accepts or rejects depending on whether he/she recognizes the output.

For a given n, the coding scheme is determined by $\{\Sigma, c_n, t, m(n), k(n), S_{r1}, S_{r2}, \ldots, S_{rk}(n)\}$ and if different input lengths n over the same alphabet is desired, we can define a family of encodings, $$\Sigma, m(n), k(n), \{c_n, t, S_{r1}, S_2, \ldots, S_{r2(n)}\}_{n \geq 1}.$$

This completes the formal description of one possible coding scheme.

Observation: For a probability distribution D on a discrete set $\{x_1, x_2, \ldots x_n\}$, define the entropy, $$H(X) = -\Sigma_i \log_2(Pr_D[X=x_i]) \cdot Pr_D[X=x_i],$$

i.e., the expected number of (binary) bits required to represent an element chosen at random by D. It is well-known that for any function f, $H(f(X)) \leq H(X)$, with equality if, and only if, f is one-to-one. Hence, this shows that our coding function $c_n$ can preserve the entropy of the original random source by making it one-to-one. (There are some cases when it is actually undesirable to have the coding one-to-one, see the comments below.)

The purpose of the redundancy function is to improve "appearance" of the produced output. For instance, binary strings are converted into English language sentences, it may be beneficial to introduce extra words (e.g. prepositions) that have no significance for the coding, other than to increase readability. An example of such redundancy is to be found below. Even when a unique preimage is desired it is therefore only necessary that the coding is unique, when restricted to the non-redundant parts as discussed above.

In some cases it may be advantageous to not let the coding be one-to-one. Consider, for instance, the checksum scenario where the checksum is a 160-bit hash value. One possible way of converting this into English would be to interpret each byte as an English word say. Thus, the output would be some twenty (English) words in length. The mere length of this sequence may still make it difficult to memorize and it may actually be a good idea to compromise security slightly by ignoring some parts of the hash value before the conversion takes place. In such cases a two-step verification may be used: if the user is suspicious that the check sum (converted into English plain language) is not correct, a second manual control of the actual entire check sum can be performed. Although the text to compare to now is very long, it is still much easier for a human to read and compare to English language sentences of, say 20 words, than to compare to 160-bit random binary strings.

Due to the problems of generating large, realistic, examples manually, the given examples will be simple. However, the examples should suffice as an illustration to those of ordinary skill in the art.

Passphrase Generation

Example 1

Consider the case when a security equivalent to a completely random two-digit PIN-code is requested. Hence, n=2 and the alphabet is $\Sigma=\{0, 1, \ldots 9\}$ and b=10. This should be converted into a three-word English sentence, i.e. j(n)=3. And for each i, i=1, 2, 3, $S_i$ will be a set of English words where $S_2$ and $S_3$ looks as follows:

| $S_2$ | $S_3$ |
|---|---|
| 0. car | Swims |
| 1. dog | Sails |
| 2. man | Dies |
| 3. horse | Screams |
| 4. bicycle | Jumps |
| 5. woman | Remembers |
| 6. ship | Sleeps |
| 7. apple | Breaks |
| 8. glass | Crawls |
| 9. computer | Forgets |

The coding, $C_2$, is simple. For a two-digit input $x=x_1 x_2$, $C_2(x_1 x_2)$ is simply the $x_1$th word from $S_2$, followed by the $x_2$th word from $S_3$. To improve "readability" a leading "the" is always added, i.e. $S_1=\{\text{the}\}$. Thus, the redundancy function is defined by t=(1, 2, 3), and $\rho_{2,t}(w_2 w_3)=$"the" $w_2 w_3$.

Suppose that the input PIN-code/checksum is "71" (generated at random). Then select the seventh word out of the first column, "apple", and the first word from the second column, "sails", giving the code "apple sails". A leading "the" is added and the output is "the apple sails". If, for example the three-word sentence "the dog jumps" is to be converted back to the corresponding code, by redundancy, the leading "the" is deleted. The remaining two words are converted back to decimal digits by reverse table look-up; "dog"→1, "jumps"→4, i.e. the PIN-code is "14". This code (or a function thereof) is then compared to some value stored in an internal database, whereupon decision of acceptance/rejection is made. An invalid (non-existing code) such as "the car stops", can of course easily be detected. Clearly, the entropy of the produced sentences are equivalent to two-digit decimal numbers.

Notice that knowledge of the above table (the coding function) in no way aids an adversaries a priori advantage in guessing a correct password, as long as the string from which it was generated is truly random.

Example 2

A graphical coding is briefly outlined, converting checksums or PIN-codes as above into graphical objects on a computer's screen. For instance, the first and second digit can be interpreted as (x,y) grid points in a 10-by-10 grid on the screen, where an object is drawn. If converting back to PIN-code, the object is placed on the screen, by dragging it using the computer's mouse. Alternatively, the first digit of the PIN-code could specify the type of object and the second could be the location on the screen; there are many possibilities. Colour graphics may for example be used, changing color of objects. Other graphical transformation such as rotations, etc are also possible.

Example 3

As previously discussed, the case where a computer program is to be checked for authenticity is considered. Suppose a 160-bit hash value (or some other means of check sum) of the actual program code, p, is computed, h(p). This h(p) is then converted into English language as follows: similar to the above we have 10 tables, $S_1, \ldots S_{10}$, each table consisting of (at most) 256 English words. Every second 8-bit block of h(p) indexes one of the tables, the 2ith 8-bit block, $h(p)_{2i}$, indexes table $S_i$ by selecting word $h(p)_{2i}$ mod $|S_i|$ from table $S_i$, where $|S_i|$ denotes the number of words in $S_i$, $i=1, \ldots, 10$. (Thus every second 8-bit block, $h(p)_{2i+1}$, of the hash is ignored.) This will then produce a 10-word English sentence. Finally, some redundancy may be added for readability.

Example 4

So far, a common denominator for all the examples is that the input random string has been divided into parts and each part has then, independently been used to index a "table" or similar. Although the phrases constructed in this way may be perfectly meaningful considered as English language sentences, they may not look very natural due to this independence. In fact, in natural language, the next word is far from independent of previous ones. Studies of such phenomena were done already by C. E. Shannon, see [Shannon]. For instance, in Example 1 above, the sentence "the woman swims" looks much more natural than "the apple forgets", although both are perfectly correct grammatically.

In general, a stochastic process will be simulated in discrete time, $X_1, X_2, \ldots$. The probability of $X_i=s$, then depends on the previously observed outcomes $$Pr[X_i=s|X_{i-1}=s_{i-1}, X_{i-2}=s_{i-2}, \ldots, X_1=s_1]$$

and can in general not be expressed only in terms of s and i. A particularly attractive special case is when we have a Markov-process, so that the outcome of $X_i$ depends only on $X_{i-1}$:

$$Pr[X_i=s_i|X_{i-1}=s_{i-1}, X_{i-2}=s_{i-2}, \ldots, X_1=s_1]=Pr[X_i=s_i|X_{i-1}=s_{i-1}].$$

However, the example is given in full generality.

Suppose as input, a checksum, h(p), of some apparatus or computer program, p, that we wish to validate. Assume without loss of generality, that h(p) is a binary string of length n. The desired output is of length k(n) (e.g. an English language sentence of k(n) words), having k(n) tables, $\{S_i\}$, $S_i$ having $|S_i|$ entries. A table of the values is assumed.

$$p(i, s_i, s) = Pr[X_i=s_i|X_{i-1}=s_{i-1}, X_{i-2}=s_{i-2}, \ldots, X_1=s_1]$$

where $s=(s_{i-1}, s_{i-2}, \ldots, s_1)$, for each $i=1, \ldots, k(n)$, and each $s_i$, s. (Alternatively, it is assumed that these values can be efficiently computed "on the fly".) n is assumed to be sufficiently large. What this means and why it is required will be explained below.

Divide h(p) into k(n) parts, $h(p)_1, \ldots, h(p)_{k(n)}$, in the natural way. (Thus, $n \geq k(n)$ and observe that in general, it may not be required that the length of each $h(p)_i$ is determined beforehand, it may happen that the length of $h(p)_i$ depends on $h(p)_1, \ldots, h(p)_{i-1}$.) Assume inductively that $h(p)_1, \ldots, h(p)_{i-1}$ is already converted into output $s_i, \ldots, s_{i-1}$ (e.g. English words), then, how is the $S_i$ to output next computed? It is known that $s=(s_{i-1}, s_{i-2}, \ldots, s_1)$, since it has already been computed and by assumption, given s, it is known that:

$$p_{i,s}(s_j) = p(i, s_j, s) = Pr[X_i=s_j|X_{i-1}=s_{i-1}, X_{i-2}=s_{i-2}, \ldots, X_1=s_1]$$

for each possible choice of $s_j \in S_i$. Furthermore, suppose that the length (number of bits) of $h(p)_i$, denoted m, is at least $m \geq \log_2 \epsilon^{-1} + \max_j \lceil \log_2 p_{i,s}(s_j)^{-1} \rceil$, where $\epsilon$ is a security parameter, the determination of which is postponed. Define $t(0)=0$ and $t(j)=t(j-1)+p_{i,s}(s_j)$, $j=1, 2, \ldots, |S_i|$, so that $t(|S_i|)=1$.

Finally, interpret the binary string $h(p)_i$ as an integer in the natural way and compute the value $$T_i = 2^{-m} \cdot h(p)_i. \text{ (Note that } T_i \in [0,1].)$$

The $s_j \in S_i$ is determined by the j for which $T_i \in [t(j-1), t(j)]$ and is outputted. Having computed $s_j$, now proceed with $s_{j+1}$ and so on.

If the scheme is analyzed, it may be observed that if $T_i$ was completely uniformly distributed in [0,1], then each $s_j \in S_i$ would be chosen with probability $t(j)-t(j-1)=p_{i,s}(s_j)$, which is the correct probability. This may not be completely true, but assuming that $h(p)_i$ is uniformly distributed in $[0, 2^m-1]$, so by the lower bound on the length of $h(p)_i$, i.e. m, it is seen that each $s_j$ is chosen with a probability that is within $\epsilon$ of the true distribution of $X_i$, given $X_{i-1}, X_{i-2}, \ldots, X_1$. The parameter $\epsilon$ can therefore be chosen according to security requirements. The required length of the string of h(p), i.e. the value n can also be calculated. By the above, the requirement is $$n = \Sigma_i \operatorname{length}(h(p)_i) \geq k(n) \cdot \log_2 \epsilon^{-1} + \rho_i \max_j \log_2 P_{i,s}(s_j)^{-1}.$$

Defining $q = \min_{i,j} \log_2 p_{i,s}(s_j)$, it is seen that $$n \geq k(n) \cdot (\log_2 \epsilon^{-1} + q^{-1})$$

suffices. Now, in practice h(p) may be a 160-bit hash value and may not fulfill the inequality above. If this is the case, h(p) can be used as the input seed to a pseudo random number generator, g, and use g(h(p)) instead. It is well known that any polynomial stretching factor of the original length can be obtained in a secure way.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of authenticating at least a first device to a user, the method comprising a conversion of a checksum generated within the first device to a user friendly output format, the method comprising:
   a set up sequence, comprising:
      receiving and storing at least a first preferred output format selected from at least two user friendly output formats; and
      receiving and storing a specification of keying material to be included in the checksum calculation, and
   a device configuration verification sequence comprising:
      extracting the selected keying material from at least one identification module comprised in the personal device;
      calculating a checksum based on the keying material;
      determining which user friendly output format to use, said determination at least partly based on the at least a first preferred output format; and
      converting the checksum to the selected user friendly output format;
   wherein the user friendly output format comprises one or a combination of an image, a sound, and a text; and
   wherein the keying material comprises a device identifier.

2. The method according to claim 1, wherein at least the first preferred output format is entered to the first device by the user.

3. The method according to claim 2, wherein the conversion to a user friendly output format is further based on the current configuration of the first device.

4. The method according to claim 2, wherein at least a first and a second preferred output format are selected by the user and received and stored by the first device, and the first preferred output format is used if the first device is in a first configuration, and the second preferred output format is used if the first device is in a second configuration.

5. The method according to claim 1, wherein the checksum is calculated based on a plurality of keying material provided within the first device, and the selection of keying material is variable and selectable.

6. The method according to claim 1, wherein the configuration verification sequence is repeated during the operation of the first device.

7. The method according to claim 1, wherein the configuration verification sequence can be activated manually.

8. The method according to claim 6, wherein the set-up sequence can be activated manually.

9. The method according to claim 1, wherein if the first device has executed the set-up sequence and the device configuration sequence at least once and thus the first device has been authenticated, then said first device is used to authenticate a second device.

10. The method according to claim 9, further comprising the steps of:
receiving an external checksum transferred from the second device to the first device; and
converting in the first device the external checksum, which was transferred from the second device to the first device, to a user friendly output format.

11. The method according to claim 10, wherein the user friendly output format is pre-selected.

12. The method according to claim 10, wherein an initial part of the method, to be performed on an initial encounter between the first device and the second device, comprises the steps of:
receiving an initial checksum transferred from the second device; and
converting in the first device the initial checksum, which was transferred from the second device, to a user friendly output format,
and a consecutive part of the method, to be performed on consecutive encounters between the first device and the second device, comprises the steps of:
receiving a consecutive checksum transferred from the second device; and
converting in the first device the consecutive checksum, which was transferred from the second device, to a user friendly output format.

13. The method according to claim 9, wherein an initial part of the method, to be performed on an initial encounter between the first device and the second device, comprises the steps of:
receiving an initial checksum transferred from the second device; and
storing a representation of the initial checksum, which was transferred from the second device, in the first device,
and an consecutive part of the method, to be performed on consecutive encounters between the first device and the second device, comprises the steps of:
receiving a consecutive checksum transferred from the second device; and
comparing in the first device the consecutive checksum with the initial checksum, and if the initial and consecutive checksums do not agree, issue a warning message.

14. The method according to claim 13, wherein a plurality of representations of initial checksums corresponding to a plurality of different second devices is stored by the first device, and on consecutive encounters with one of the plurality of second devices the comparing step comprises:
comparing the consecutive checksum, which was transferred from the second device, with the plurality of stored initial checksum, and
issuing a warning message if the consecutive checksum, which was transferred from the second device, does not agree with any of the stored initial checksums.

15. The method according to claim 10, wherein the representations of the initial checksums, which checksums were transferred from the second device to the first device, are obtained by encryption transformation of the initial checksums, which were transferred from the second device to the first device.

16. The method according to claim 9, wherein an initial part of the method, to be performed on an initial encounter between the first device and the second device, comprises the steps of:
receiving an initial checksum transferred from the second device;
storing a representation comprising the initial checksum, which was transferred from the second device, and a value representing a set of devices,
and an consecutive part of the method, to be performed on consecutive encounters between the first device and the second device, comprises the steps of:
receiving a consecutive checksum transferred from the second device;
extracting in the first device, a value based on the consecutive checksum and the stored representation comprising the initial checksum, which was transferred from the second device, and a value representing a set of devices, and converting said value to a user friendly output format.

17. The method according to claim 16, wherein an XOR-operation is used to form the representation, and to extract one or more of the initial checksum and the value representing a set of devices.

18. The method according to claim 16, wherein the said representation is obtained by an encryption transformation.

19. A personal device provided with a plurality of man-machine communication interfaces, and adapted for communication with other devices, the personal communication device comprising:
a plurality of identification modules adapted, when executed by a processor, to provide keying material to be included in the checksum calculation,
a calculating module adapted, when executed by the processor, to calculate a checksum based on the keying material,
a user preference specification module adapted, when executed by the processor, to receive and store a user selection of at least one preferred output selected from at least two user friendly output formats,
the user preference specification module further adapted, when executed by the processor, to determine which user friendly output format to use, said determination at least partly based on the at least a first preferred output format,
a conversion module adapted, when executed by the processor, to convert the checksum to the selected user friendly format, and
said user preference specification module connected to the calculating module and to at least one conversion module,
wherein the user friendly output format comprises one or a combination of an image, a sound, and a text, and
wherein the keying material comprises a device identifier.

20. The personal device according to claim 19, wherein the preference specification module is further adapted, when executed by the processor, to receive and store a user selection of keying material.

21. The personal device according to claim 19, further comprising:
- a receiving module adapted, when executed by the processor, to receive an external checksum from a second device,
- a comparison module adapted, when executed by the processor, to compare received and stored external checksums, and
- a storage module adapted, when executed by the processor, to store a plurality of external checksums.

22. The personal device according to claim 19, further comprising:
- a receiving module connected to the user preference module and adapted, when executed by the processor, to receive an external checksum from a second device and transfer the external checksum to the user preference module for further conversion in one of the conversion modules.

* * * * *